United States Patent
Bhattacharya et al.

(10) Patent No.: US 8,799,657 B2
(45) Date of Patent: Aug. 5, 2014

(54) METHOD AND SYSTEM OF RECONSTRUCTING A SECRET CODE IN A VEHICLE FOR PERFORMING SECURE OPERATIONS

(75) Inventors: Debojyoti Bhattacharya, Bangalore (IN); Sugato Chakrabarty, Bangalore (IN); Bhargav Ramchandra Bellur, Bangalore (IN)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/564,943

(22) Filed: Aug. 2, 2012

(65) Prior Publication Data

US 2014/0037092 A1 Feb. 6, 2014

(51) Int. Cl.
*H04L 29/06* (2006.01)
*H04L 9/32* (2006.01)
*G07C 9/00* (2006.01)
*H04L 9/08* (2006.01)

(52) U.S. Cl.
CPC .......... *H04L 9/3273* (2013.01); *G07C 9/00174* (2013.01); *H04L 9/0891* (2013.01); *H04L 9/3242* (2013.01); *H04L 2209/84* (2013.01)
USPC ............................ 713/171; 380/259; 307/10.3

(58) Field of Classification Search
CPC ... H04L 9/3273; H04L 9/0891; H04L 9/3242; H04L 2209/84; G07C 9/00174
USPC ............................ 380/259; 713/171; 307/10.3
See application file for complete search history.

(56) References Cited

U.S. PATENT DOCUMENTS

| | | | | |
|---|---|---|---|---|
| 5,808,372 A * | 9/1998 | Schwegler et al. | .......... | 340/5.64 |
| 6,160,488 A * | 12/2000 | Honda | .......... | 340/5.65 |
| 6,182,214 B1 * | 1/2001 | Hardjono | .......... | 713/163 |
| 6,683,391 B1 | 1/2004 | Enoyoshi et al. | | |
| 6,977,576 B2 | 12/2005 | Denison et al. | | |
| 7,187,266 B2 | 3/2007 | Hasegawa et al. | | |
| 7,257,844 B2 * | 8/2007 | Woodward | .......... | 726/31 |
| 7,327,227 B2 | 2/2008 | Ohtaki et al. | | |
| 2002/0049904 A1 * | 4/2002 | Nowottnick et al. | .......... | 713/169 |
| 2006/0208069 A1 * | 9/2006 | Gilbert et al. | .......... | 235/382.5 |
| 2006/0214766 A1 * | 9/2006 | Ghabra et al. | .......... | 340/5.25 |
| 2006/0219776 A1 | 10/2006 | Finn | | |

(Continued)

FOREIGN PATENT DOCUMENTS

| | | | |
|---|---|---|---|
| JP | 2004238985 A | 8/2004 | |
| JP | 2008001310 A | 1/2008 | |

OTHER PUBLICATIONS

Red Hat Enterprise Linux 4, "Introduction to System Administration", 2005, 200 pages.*

*Primary Examiner* — Michael Pyzocha

(57) ABSTRACT

A method is provided for constructing a secret code in a processing unit when in communication with a portable security unit. Mutual authentication messages are exchanged between a linked portable security unit and processing unit. A first portion of the secret code is communicated to the processing unit. The processing unit combines the first portion and a second portion of the secret code stored in the non-volatile memory of the processing unit. The secret code is stored in a volatile memory of the processing unit. A secure operation is performed using the secret code. The portable security unit is de-linked from the processing unit. At least a portion of the secret code is deleted from the volatile memory of the processing unit.

23 Claims, 3 Drawing Sheets

(56) References Cited

U.S. PATENT DOCUMENTS

| | | | |
|---|---|---|---|
| 2007/0279184 A1* | 12/2007 | Desai et al. | 340/5.26 |
| 2008/0027602 A1* | 1/2008 | Yeap et al. | 701/29 |
| 2009/0022317 A1* | 1/2009 | Akima et al. | 380/277 |
| 2009/0310455 A1* | 12/2009 | Uchiyama | 369/53.21 |
| 2010/0220857 A1* | 9/2010 | Kawamura et al. | 380/44 |
| 2011/0064224 A1* | 3/2011 | Rebuli | 380/277 |
| 2011/0258435 A1* | 10/2011 | Bellur et al. | 713/158 |
| 2012/0321076 A1* | 12/2012 | Shah et al. | 380/44 |

* cited by examiner

METHOD AND SYSTEM OF RECONSTRUCTING A SECRET CODE IN A VEHICLE FOR PERFORMING SECURE OPERATIONS

BACKGROUND OF INVENTION

An embodiment relates generally to reconstructing a secret code for security access between two communication devices.

Key cryptography is a method where a key is provided to determine a function output of a cryptographic algorithm or cipher. The key typically identifies a particular transformation of some type of cipher into a non-ciphered code during decryption and vice versa during encryption.

In a vehicle security system, skilled attackers who break into vehicles have details of or can obtain the cryptographic algorithm readily from a storage device if the key and cryptic codes are stored in the same memory location. Without the key, the cryptographic algorithm provides no details or output. Therefore, it is imperative to keep the key safe; however, that has proven to be a difficult task as the key is typically stored in a non-volatile memory of the vehicle or controller for which the attacker is attempting to access. If the attacker gains access to both the key and the algorithm, then the attacker can access a secure operation. Therefore, there is a demand for an enhanced security system when using a decryption key for security purposes to enable secure operations.

SUMMARY OF INVENTION

An advantage of an embodiment is the deterrent of an attacker gaining simultaneous access to a decryption key and a secret code which provides security access to a vehicle function.

An embodiment contemplates a method for constructing a secret code in a processing unit when in communication with a portable security unit. The processing unit and portable security unit each contain respective volatile and non-volatile memory. The processing unit uses the security code to perform a secure operation. The portable security unit is linked with the processing unit. Mutual authentication messages are exchanged between the portable security unit and the processing unit as a condition to continuing the method. A first portion of the secret code is communicated to the processing unit. The first portion is stored in the non-volatile memory of the portable security unit. The first portion of the secret code is combined with a second portion of the secret code stored in the non-volatile memory of the processing unit. A combined secret code is stored in a volatile memory of the processing unit. The secure operation is performed using the secret code. The portable security unit is de-linked from the processing unit. At least a portion of the secret code is deleted from the volatile memory of the processing unit when the portable security unit is removed.

An embodiment contemplates a vehicle security system where a processing unit constructs a secret code. The processing unit has a non-volatile memory and a volatile memory. A portable security unit links to the processing unit. The portable security unit communicates with the processing unit for performing mutual authentication between the portable security unit and the processing unit in response to being linked to one another. The portable security unit has a non-volatile memory for storing a first portion of the secret code. The first portion of the secret code is communicated to the processing unit in response to a successful mutual authentication between the portable security unit and the processing unit. The first portion of the secret code is combined with a second portion of the secret code stored in the non-volatile memory of the processing unit and the constructed secret code is stored in the volatile memory of the processing unit. A secure operation is performed using the secret code.

DETAILED DESCRIPTION

Figure 1:
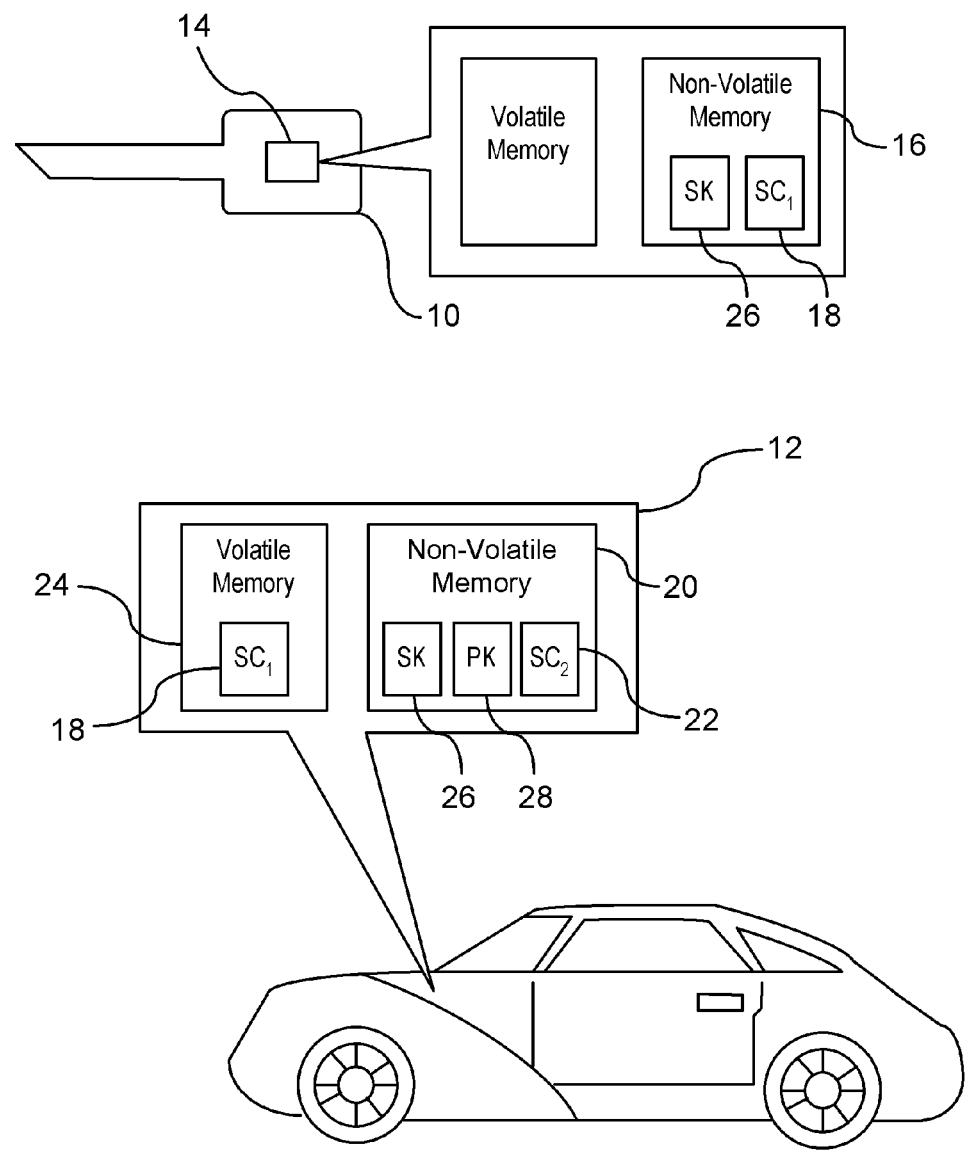
FIG. 1 is a vehicle security communication system according to an embodiment of the invention.

There is shown in FIG. 1 a vehicle communication system between a portable security unit 10 and a processing unit 12. The portable security unit 10 may include, but is not limited to, a vehicle ignition key for accessing the interior of a vehicle and to actuate the starting of an engine of the vehicle. The portable security unit 10 includes a dongle 14. The dongle 14 is a small piece of portable hardware that communicates with a computer, or in this embodiment, the processing unit 12. The dongle 14 is preferably co-located with the vehicle's ignition key for communication with a processing unit 12 of the vehicle. The dongle 14 includes non-volatile memory 16 for storing a first portion of a secret code ($SC_1$) 18.

The processing unit 12, may include but is not limited to, an electronic control unit (ECU), for controlling access to a vehicle, and moreover, an engine start operation of the vehicle. The processing unit 12 includes non-volatile memory 20 for storing a second portion of the secret code ($SC_2$) 22. The processing unit 12 further includes volatile memory 24 for temporarily storing the first portion of the secret code ($SC_1$) 18 transferred from the dongle 14 which will be discussed in detail later. The respective portions of the secret code when combined (and may be decrypted) are used to perform a secure operation such as enabling an engine start operation of the vehicle or used to sign digital messages transmitted by the processing unit 12.

A symmetric key (SK) 26 is stored in the non-volatile memory 16 of the dongle 14 and is also stored in the non-volatile memory 20 of the processing unit 12. The symmetric key (SK) 26 stored in each of the respective memory units is used to mutually authenticate the portable security unit 10 and the processing unit 12 so that each may perform further communications within one another and share secure information.

A first key (PK) 28 is stored within the non-volatile memory 20 of the processing unit 12 and is used to decrypt the encrypted secret code for performing a secure operation. Since an experienced attacker can gain access to the secure operation if the first key (PK) 28 and the combined secret codes are stored in a single device, it is an objective of an embodiment of the invention to keep the first key (PK) 28 and at least a portion of the secret code in separate devices (i.e., the portable security unit and the processing unit) for deterring access to the secure operations when the portable security unit 10 is not linked to the processing unit 12. That is, an attacker who does not have access to either one of the processing unit 12 or the dongle 14 cannot compromise the secret code. Therefore, by maintaining at least a portion of the secret code in the non-volatile memory 16 of the dongle 14 which is distinctly dislocated from the first key (PK) stored in the non-volatile memory 20 of the processing unit 12 of the vehicle, an attacker having only access to one of the devices will be deterred from gaining access to the secure operations.

Figure 2:
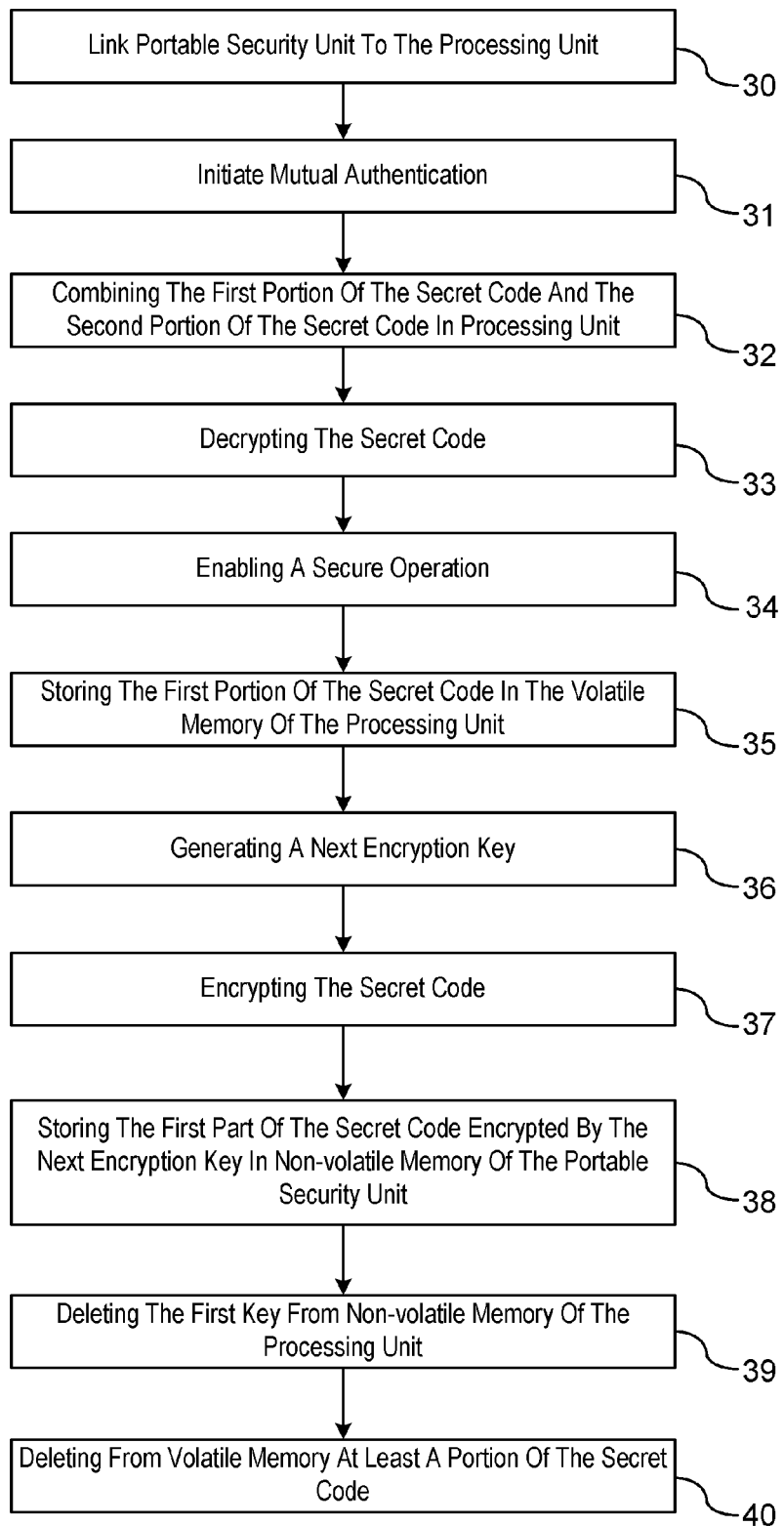
FIG. 2 is a flow diagram of an authentication communication process according to the embodiment of the invention.

FIG. 2 illustrates a flow diagram describing the interaction between the portable security unit and the processing unit. It should be understood that the process flow described below involves encryption/decryption of the secret code. However, in alternative embodiments, encryption/decryption may not be utilized, and those steps in the process flow diagram described in the flow diagram below will be duly noted.

In block 30, the portable processing unit is linked to the processing unit. The communication link may be a wired link or may be a wireless link. For example, when an ignition key is inserted in the ignition, the dongle establishes a wired or wireless communication link with the ECU of the vehicle.

Figure 3:
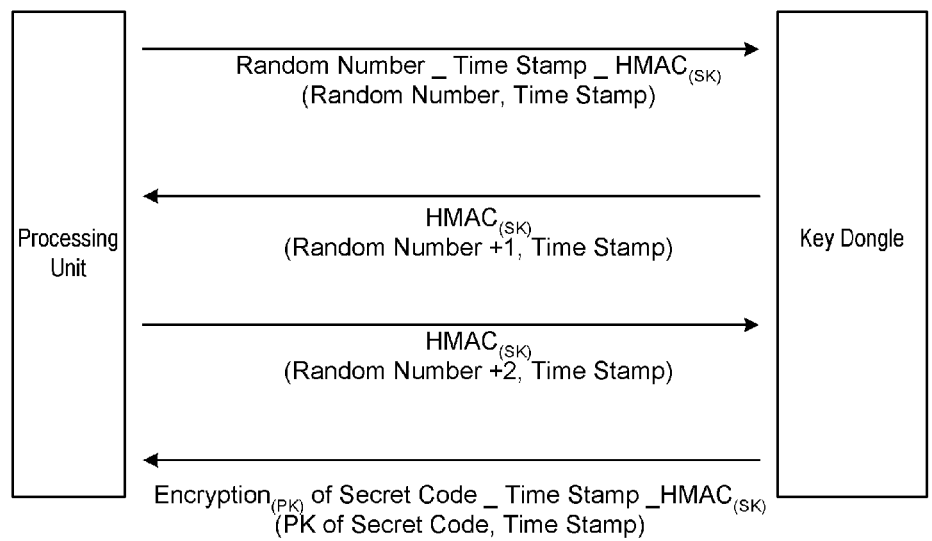
FIG. 3 is a process flow diagram between communication devices of the vehicle security communication system according to the embodiment of the invention.

In block 31, mutual authentication between the portable security unit and the processing unit is initiated. FIG. 3 is an example of a communication flow between the vehicle ECU and the key dongle to establish mutual authentication. In the first communication exchange (A), the vehicle ECU generates a random number of a desired length and computes a hash message authentication code (HMAC) on the random generated number concatenated with a current timestamp that includes the symmetric key for authentication. This is provided to the dongle. HMAC is a type of message authentication code that is generated/calculated using a specific algorithm that involves a cryptographic function in combination with a secret key. This is used to verify both authenticity of the message and data integrity of the message. Authentication is the act of confirming the truth or trustworthiness of the message or transmitting device. Data integrity is verification that the data as a whole is correct, complete, or preserved from its original transmitted state. The first mutual communication exchange is performed to initiate a mutual authentication protocol.

A second mutual communication exchange (B) involves the dongle checking the correctness of the received HMAC. Upon receiving the correct HMAC, the dongle increments the random number by 1 and computes the HMAC on the incremented random number and the received timestamp. The computed HMAC is then sent to the vehicle ECU.

A third mutual communication exchange (C) involves checking the correctness of the received HMAC from the dongle. Upon verifying the correctness of the HMAC from the dongle, the vehicle ECU increments the random number by 2 and computes the HMAC on the incremented random number and timestamp. The computed HMAC is sent to the dongle. The exchange authenticates the dongle to the vehicle ECU.

A fourth mutual communication exchange (D) involves checking the correctness of the received HMAC from the vehicle ECU. This exchange authenticates the vehicle ECU to the dongle and also assures the dongle that it has been authenticated at the vehicle end. The dongle then sends the first portion of the encrypted secret stored in the non-volatile memory of the dongle to ECU along with the timestamp and the computed HMAC.

If any of the above mutual exchange steps (A)-(D) fail for any reason, the routine is aborted thereby maintaining the secrecy and preventing an attacker from obtaining at least a portion of the secret code.

Referring again to FIG. 2, in block 32, in response to a successful mutual authentication between the portable security unit and the processing unit, first portion of the secret code ($SC_1$) sent by the dongle to the processing unit and the second portion of the secret code ($SC_2$) stored in the non-volatile memory of the processing unit are combined and stored in the volatile memory associated with the processing unit.

In block 33, the combined first and second portions of the secret code are decrypted using the first key (PK). The first key (PK) is the parameter that determines a functional output of the cryptographic cipher. Decrypting the secret code from its encrypted state allows the secret code to be used for the secure operation. It should be understood that if encryption/decryption is not used, the block 33 is omitted from the flow process.

In block 34, the secret code is used to enable the secure operation (e.g., enabling the starting of the engine or to sign messages digitally or to encrypt messages).

In block 35, the first portion of the secret code ($SC_1$) is stored in the volatile memory of the processing unit. Alternatively, the secret code as a whole ($SC_1$) and ($SC_2$) may be stored in the volatile memory of the processor. Moreover, a volatile memory other than the processing unit may be used to store the secret code and the secret code may be communicated to the processing unit for future use when needed.

In block 36, a next encryption key ($PK_n$) is generated. This step is not required when encryption/decryption is not utilized.

In block 37, the next encryption key ($PK_n$) is used to encrypt the secret code. In the case where this is used in a vehicle, encrypting the secret code with the next encryption key ($PK_n$) is performed prior to the engine being turned off. This step is not required when encryption/decryption is not required.

In block 38, the encrypted secret code is partitioned into a first part and a second part. The first part of the secret code encrypted using the next encryption key ($PK_n$) is transferred to the portable security unit and stored in the non-volatile memory of the portable security unit. The second part of the secret code using the next encryption key ($PK_n$) is stored in the processing unit. It should be understood that each time the secret code is partitioned using a next encryption key, each part of the partition can have a different length and value in contrast to the previous partitions. Alternatively, if encryption is not utilized, then the first portion of the secret code or at least some portion of the secret code thereof is stored in the non-volatile memory of the portable security unit.

In block 39, the first key is deleted from the non-volatile memory of the processing unit after an acknowledgement from the dongle that the encrypted first part of the secret code has been successfully stored in the non-volatile memory of the portable security unit. This step is not required if encryption/decryption is not utilized.

In block 40, after predetermined operation, such as the engine turning off or the ignition key being removed from the ignition, at least a portion of the secret code is deleted from the non-volatile memory of the processing unit or other device temporarily storing the secret code.

As a result, an attacker who obtains the processing unit can steal the second portion of the secret code and the decryption key which is used to decrypt the secret code; however, the attacker does not have access to the first portion of the secret code that is stored only in the portable security unit. Therefore, access to a secured operation is prevented.

A second scenario involves an attacker who obtains the portable security unit. The attacker can only compromise the first portion of the secret code. The portable security unit does not have the decryption key, therefore, the first secret code is safe to the extent of the strength of the encryption algorithm and the length of the encryption key.

A third scenario involves an attacker who eavesdrops across the communication channel and records the secret code communicated between the portable security unit and the processing unit. The attacker would record the data and later decrypt it off-line using the first key when the attacker obtains the processing unit. However, the successfulness of the attacker is relative low due to the difficulty in eavesdropping short range wireless communications since a high gain receiver has to be present in close proximity to the vehicle. Secondly, since the encryption key is changed every time a predetermined condition occurs, such as the turning off of the ignition, the change in the encryption/decryption key and the change in the encrypted first portion of the secret code renders the previously captured first portion of the secret code stale and useless. Thereby, the attacker's attempts in all three scenarios are thwarted.

It should be understood that the embodiments described can be used with a vehicle that has multiple ignition keys to initiate an engine start operation (e.g., where each person of a family has a respective ignition key). Each of the respective ignition keys for associated with the vehicle is a respective portable security unit. In such an instance, each of the ignition keys has a different and unique identification code stored within the vehicle. Each of the ignition keys may or may not share the same symmetric (SK) for mutual authentication; however, each respective ignition key will have a respective encryption key ($PK_x$) that is used to generate a respective secret code designated only for an associated ignition key. When a respective ignition key is inserted in the ignition, the processing unit matches an identification associated with the ignition key. The particular encryption key and respective secret code associated with the identification of the ignition key is retrieved. Following the identification of the ignition key, the procedure for decrypting the secret code, enabling the secure operation, generating a next encryption key, encrypting the secret code, and splitting and storing the secret code with respect to the identified ignition key is the same as method described in FIG. 2.

While certain embodiments of the present invention have been described in detail, those familiar with the art to which this invention relates will recognize various alternative designs and embodiments for practicing the invention as defined by the following claims.

What is claimed is:

1. A method for constructing a secret code in a processing unit when in communication with a portable security unit, wherein the processing unit and portable security unit each contain respective volatile and non-volatile memory, and wherein the processing unit uses the security code to perform a secure operation, the method comprising the steps of:

linking the portable security unit with the processing unit;
   exchanging mutual authentication messages between the portable security unit and the processing unit as a condition to continuing the method;
   communicating a first portion of the secret code stored in the non-volatile memory of the portable security unit to the processing unit;
   combining a second portion of the secret code stored in the non-volatile memory of the processing unit with the first portion of the secret code;
   storing at least the first portion of the secret code in a volatile memory of the processing unit;
   performing the secure operation using the secret code;
   splitting the combined secret code into two parts and storing a first part in the non-volatile memory of the portable security unit and a second part in the non-volatile memory of the processing unit;
   de-linking the portable security unit from the processing unit, the first part of the secret code being stored in the non volatile memory of the portable security unit prior to de-linking the portable security unit from the processing unit; and
   deleting at least a portion of the secret code from the volatile memory of the processing unit.

2. The method of claim 1 further comprising the steps of splitting the secret code into two parts and storing a first part in the non-volatile memory of the portable security unit and a second part in the non-volatile memory of the processing unit.

3. The method of claim 1 wherein the first portion of the secret code and the second portion of the secret code are encrypted based on a first key, wherein the first key is not stored in the portable security unit, and wherein the first key is used to decrypt the first portion of the secret code and the second portion of the secret code, and wherein the first key is stored in a non-volatile memory of the processing unit.

4. The method of claim 3 further comprising the steps of:

generating a next encryption key for replacing the first key used to decrypt the first portion and second portion of the secret code;
   encrypting the first part of the secret code using the next encryption key;
   storing the first part of the secret code encrypted by the next encryption key in the portable security unit; and
   deleting the first key from the non-volatile memory of the processing unit.

5. The method of claim 4 wherein the deleting of the first part of the secret code from the volatile memory of the portable security unit and deleting the first key from the non-volatile memory of the processing unit is performed after an acknowledgment that the first part of the secret code encrypted by the next encryption key has been successfully stored in the portable security unit.

6. The method of claim 3 wherein the portable security unit includes a dongle embedded in an ignition key for a vehicle, wherein the processing unit includes an electronic control unit of a vehicle, wherein mutual authentication is performed when the ignition key is turned to an on position, wherein the dongle communicates the first portion of the secret code to the electronic control unit in response to a successful mutual authentication between the dongle and the electronic control unit, wherein the first key stored in the non-volatile memory of the electronic control unit decrypts the combined first portion of the secret code and the second portion of the secret code, and wherein secret code is stored in the volatile memory of the electronic control unit.

7. The method of claim 6 wherein a next encryption key is generated for replacing the first key stored in the non-volatile memory of the electronic control unit, wherein the first part of the secret code is encrypted using the next encryption key, wherein first part of the secret code encrypted by the next encryption key is stored in the dongle prior to an engine being turned off, and wherein the first key is deleted from the non-volatile memory of the processing unit prior to the ignition key being removed from an ignition slot.

8. The method of claim 1 wherein a symmetrical authentication key is stored in both the portable security unit and the processing unit for authenticating respective authentication signals transmitted between the portable security unit and the processing unit.

9. The method of claim 1 wherein the mutual authentication includes a first authentication signal sent from one of the portable security unit or processing unit to the other of the portable security unit or processing unit, and a second authentication signal being sent from the other of the portable security unit or processing unit to the one of the portable security unit or processing unit.

10. The method of claim 1 wherein the secure operation is comprised of an engine start operation.

11. The method of claim 1 wherein the secure operation is comprised of signing a digital message.

12. A vehicle security system comprising:
a processing unit for constructing a secret code, the processing unit having a non-volatile memory and a volatile memory; and
a portable security unit for linking to the processing unit, the portable security unit communicating with the processing unit for performing mutual authentication between the portable security unit and the processing unit in response to being linked to one another, the portable security unit having a non-volatile memory for storing a first portion of the secret code;
wherein the first portion of the secret code is communicated to the processing unit in response to a successful mutual authentication between the portable security unit and the processing unit, wherein the first portion of the secret code is combined with a second portion of the secret code stored in the non-volatile memory of the processing unit, wherein a secure operation is performed using the secret code, wherein the combined secret code is split into two parts, wherein a first part is stored in the non-volatile memory of the portable security unit and a second part in the non-volatile memory of the processing unit, and wherein the first part of the secret code is stored in the non volatile memory of the portable security unit prior to de-linking the portable security unit from the processing unit.

13. The vehicle security system of claim 12 further comprising a first key for decrypting and encrypting the first portion of the secret code and the second portion of the secret code, the first key being stored only in the non-volatile memory of the processing unit, wherein the combined portions of the secret code are decrypted using the first key stored in the processing unit for performing the secure operation.

14. The vehicle security system of claim 13 wherein at least a portion of the decrypted secret code is deleted from the non-volatile memory of the processing unit after the portable security unit is de-linked from the processing unit.

15. The vehicle security system of claim 13 wherein the processing unit generates a next encryption key for replacing the first key used to decrypt the first portion and second portion of the secret code, wherein the secret code is split into two parts, wherein the processing unit encrypts a first part of the secret code and a second part of the secret code using the next encryption key, wherein the portable security unit stores the first part of the secret code encrypted by the next encryption key in the non-volatile memory of the portable security unit, and wherein the processing unit deletes the first key from the non-volatile memory of the processing unit.

16. The vehicle security system of claim 13 wherein the portable security unit includes a dongle.

17. The vehicle security system of claim 16 wherein the dongle is integral to an ignition key.

18. The vehicle security system of claim 13 wherein the processing unit is an electronic control unit within the vehicle.

19. The vehicle system of claim 18 wherein the wherein the electronic control unit communicates the first part of the secret code encrypted by the next encryption key to the dongle prior to the engine turning off.

20. The vehicle security system of claim 19 wherein the processing unit deletes at least the portion of the secret code from the volatile memory of the processing unit after an acknowledgment is received from the portable security unit that the first part of the secret code encrypted using the next encryption key is successfully stored in the portable security unit.

21. The vehicle security system of claim 20 wherein the wherein the processing unit deletes the first key from the non-volatile memory of the vehicle after an acknowledgement that the first part of the secret code encrypted by the next encryption key is successfully stored in the dongle.

22. The vehicle security system of claim 12 wherein the secure operations includes using the secret code for enabling an engine start operation.

23. The vehicle security system of claim 12 further comprising a symmetric key stored in the portable security unit and in the processing unit, wherein the symmetric key stored in both the portable security unit and the processing unit is used to mutually authenticate the portable security unit and the processing unit.

* * * * *